UNITED STATES PATENT OFFICE.

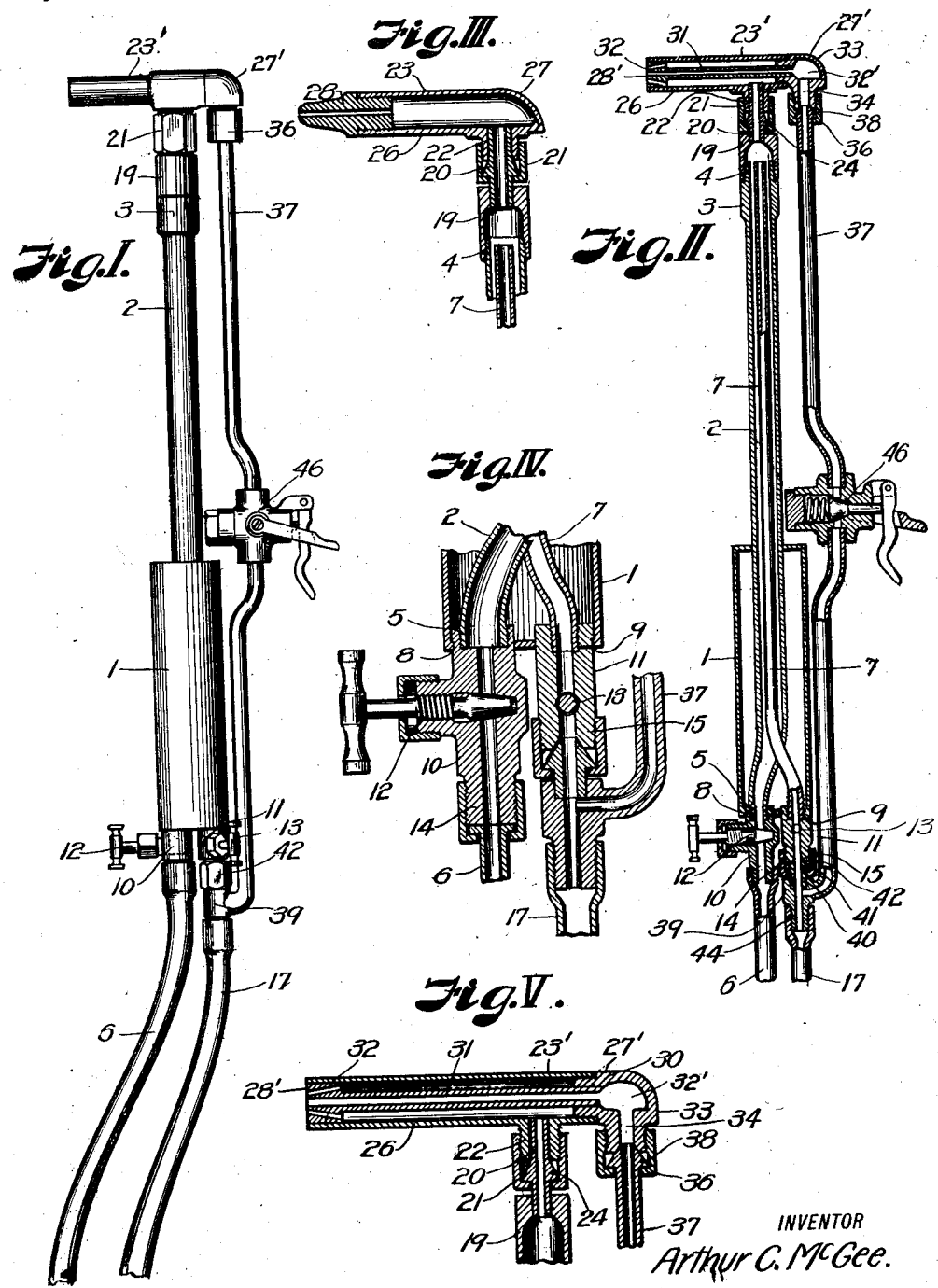

ARTHUR C. McGEE, OF OLATHE, KANSAS, ASSIGNOR TO ECONOMY WELDING MACHINE COMPANY, OF KANSAS CITY, MISSOURI, A CORPORATION OF MISSOURI.

WELDING OR CUTTING TORCH.

1,259,885.  Specification of Letters Patent.  Patented Mar. 19, 1918.

Application filed December 27, 1915. Serial No. 68,727.

*To all whom it may concern:*

Be it known that I, ARTHUR C. McGEE, a citizen of the United States, residing at Olathe, in the county of Johnson and State of Kansas, have invented certain new and useful Improvements in Welding or Cutting Torches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to torches of the oxy-acetylene type, and more particularly to a device of that character that may be used for either welding or cutting certain metals; the principal object of the invention being to provide a torch that may be used with any of a plurality of interchangeable tips, to facilitate use of the torch under variable conditions, and wherein the tips may be easily and quickly applied to or removed from the torch body.

Torches of this character are used principally for welding or cutting iron or steel, and more particularly in repairing castings, parts of machinery, etc. As the objects to be welded are frequently associated in assembled machines, and whether so assembled or in detached pieces are frequently difficult of access or arranged in different positions, tips of different length and shape must be used to properly apply the gases to the work, and as cutting requires a tip from which a jet of pure oxygen may be delivered close to a welding jet or flame, it is necessary to not only provide for interchange of tips but also to provide for supplying the pure oxygen to the tip for coöperating with the welding jet or flame.

It is, therefore, a further object of the invention to provide for proper supply of the pure oxygen and its proper combination with the oxy-acetylene jet.

In accomplishing these and other objects of the invention I have provided improved details of structure, the preferred forms of which are illustrated in the accompanying drawings, wherein:—

Figure I is an elevation of a welding and cutting torch constructed according to my invention, showing the torch equipped with a cutting tip, and illustrating the means for supplying pure oxygen to the tip.

Fig. II is a longitudinal section of the same.

Fig. III is a detail view of a welding tip which may be used with the torch.

Fig. IV is an enlarged longitudinal section of the connection of the pure oxygen conduit with the main oxygen supply tube.

Fig. V is an enlarged longitudinal section of a cutting torch, illustrating its connection with the acetylene and pure oxygen supply members.

Referring more in detail to the drawings:

1 designates a casing which may be of sufficient diameter to form a convenient handle for the torch, and extending through the casing is a pipe 2, having a head 3 at its outer end, provided with a screw-threaded nipple 4 and having a screw-threaded inner end 5 that is adapted for connection with an acetylene supply tube 6. Extending through the pipe 2, and preferably entering the same within the casing, is a relatively small pipe 7, the outer end of which terminates at the end of the nipple 4 and the inner end of which extends through the inner end of the casing. The inner ends of the pipes 2—7 extend through apertures 8—9 at the inner end of the casing and carry valve fittings 10—11 that are provided with the valves 12—13 and have threaded ends 14—15 upon which the flexible tubes 6—17 are mounted, the said tubes leading respectively to sources of supply of acetylene and oxygen gas.

Threaded onto the nipple 4 is a mixing chamber 19 having a conduit 20 extending therefrom and projecting through the end of a coupling nut 21 that is adapted for threading onto the hollow boss 22 of a tip 23, the said conduit 20 having a cone-shaped boss 24 thereon adapted for seating in the end of the hollow boss 22 to effectively seal the boss and prevent the escape of gas.

The tip 23 that is illustrated in Figs. I, II and V is one especially adapted for cutting, as distinguished from welding, in that it comprises, in addition to the welding element, means for supplying pure oxygen for oxidizing the metal after it has been melted by the welding jet to effect cutting, the interchangeable features of the tip being the same, however, as those of any tip, such as is shown in Fig. III.

The tip proper comprises a cylindrical body 26, that carries the boss 22, so that its channel opens into the cylinder between the ends thereof; the inner end of the cylinder of the cutting tip being closed by a suitable head, such as the head 27' shown in Figs. I, II and V of the drawings, and which corresponds with the head 27 of the welding tip shown in Fig. III, the outer end of which is closed by a plug 28' corresponding to the plug 28 of the welding tip but having converging openings 32 therein through which the mixed gases are delivered in a conical jet that may contact the work at its apex so that the welding jet or flame may be applied over a very restricted area.

As any mixture of free air with the welding gases, within the torch, would seriously affect the efficiency of the torch, I provide for sealing the tip, preferably by brazing the head 27' and plug 28' in the respective ends of the tip, to form air tight joints.

While any suitable welding tip, such as that shown in Fig. III, may be used with the body of the torch and the tips changed by means of the coupling which has been heretofore described, a tip of different structure and such as shown in Figs. I, II and V, is required for cutting, as it is necessary in this operation to follow the jet of mixed oxygen and acetylene with a jet of pure oxygen in order to oxidize the metal after it has been melted, and in this way secure removal of material from the "kerf" by disintegration or burning.

In order that the oxygen jet may be applied to the material as quickly as possible after the material has been primarily melted by the welding jet, and thereby avoid a cooling interval and insure a thin, sharp kerf, I project the oxygen jet concentrically of the welding jet so that it will follow the same directly and thereby effect the oxidization while the metal is in proper condition.

To best effect the result desired and also form proper connection with a source of oxygen supply, I provide the cutting tip 23', heretofore described, which is interchangeable with the welding tip by means of the hollow boss 22, coupling nut 21 and conduit 20, but wherein the head 27' is connected with the plug 28' by a tubular body 31, the bore of which extends through the plug so that a jet therefrom will deliver through the apex of the welding jet, and which communicates at its opposite end with a chamber 32' in an elbow 33 of said head.

As the pure oxygen jet is not used initially until the metal to be cut has been melted by the welding jet, I provide for separate control of the jets, while utilizing a minimum number of parts, by opening the pure oxygen conduit 37 directly to the main supply, but providing it with a control valve 46, of any suitable character, preferably located adjacent the handle casing 1 so that it may be manipulated by the operator, the flow in the mixture conduit being controlled by the valve 13 in the fitting 11.

Assuming that the parts are constructed and assembled as described, when the torch is to be used for welding, as distinguished from cutting, a suitable welding tip is applied to the torch and acetylene and oxygen gases are admitted to the pipes 2—7 through the tubes 6—17, and pass to the mixing chamber 19 at the ends of said pipes, the flow through the pipes being controlled by the valves 12—13 of the fittings 10—11. The gases passing separately through the casing and shank are delivered into the common chamber, where they mix and are forced outwardly through the restricted orifice in the tip onto the work to be done, so that the flame that is present when the gases have been ignited is directed onto the work in a point of restricted area.

Should it be desired to use the torch for cutting, the welding torch is removed by unscrewing the coupling 21. The cutting tip is then applied to the torch by means of the coupling nut, as in the case of the welding tip. The oxygen supply pipe 17 is disconnected from the fitting 11 and the T 39 of the pure oxygen conduit 37 is attached to the fitting by means of the coupling nut 42 and the tube 17 attached to the nipple 44 of said T. The outer end of the conduit 37 is then attached to the tip head by means of the coupling nut 38 to complete the connection between the tip and oxygen supply tube.

The pure oxygen supply conduit connects directly with the main oxygen supply tube 17 but the valve 46 is automatic to close the flow of pure oxygen to the tip so that flow of oxygen to the mixing chamber and for the cutting jet may be controlled independently. When the cutting is to be performed oxygen and acetylene gases are delivered to the mixer and from the conical outlet onto the work so that the metal is melted at the point of contact. When the metal has reached the molten state the pure oxygen is turned on by opening valve 46 and is delivered onto the molten metal. Pure oxygen having an affinity for iron and steel oxidizes the metal and disintegrates or burns the same so that the metal is removed to keep the kerf cleared and allow the welding jet to continuously attack fresh metal, the oxidizing jet following the welding jet closely to eliminate the metal in the kerf as the welding jet proceeds.

When the cutting is finished the cutting tip may be removed and replaced with a suitable welding tip if desired.

Having thus described my invention, what I claim as new therein and desire to secure by Letters-Patent, is:

In a torch of the character described, conduits, one inclosing the other, a mixing chamber mounted on the end of the inclosing conduit, a tip having a hollow boss thereon provided with a tapered mouth, a conduit projecting from the end of the mixing chamber, having a boss tapered at one end to fit within the mouth of the tip boss and a shoulder at the opposite end, and a coupling nut having a head engaging the shoulder on said conduit boss and a body part inclosing and threaded onto the end of the tip boss to mount the tip on said mixing chamber and seal the connection therebetween.

In testimony whereof I affix my signature.

ARTHUR C. McGEE.